United States Patent [19]
Knox

[11] 3,841,208
[45] Oct. 15, 1974

[54] APPARATUS FOR DISPERSING EFFLUENT GAS INTO THE ATMOSPHERE

[75] Inventor: George P. Knox, Midland, Mich.

[73] Assignee: The Dow Chemical Company, Midland, Mich.

[22] Filed: Aug. 10, 1973

[21] Appl. No.: 387,581

[52] U.S. Cl. .................................. 98/58, 110/162
[51] Int. Cl. ............................................. E04h 12/28
[58] Field of Search ............... 110/162, 159; 98/58; 126/105 A; 222/193

[56] References Cited
UNITED STATES PATENTS

| | | | |
|---|---|---|---|
| 538,718 | 5/1895 | Wills | 110/162 X |
| 2,633,071 | 3/1953 | Erickson | 110/162 X |
| 3,211,080 | 10/1965 | Rader | 110/162 X |
| 3,342,023 | 9/1967 | Fleming | 98/58 X |
| 3,362,318 | 1/1968 | Tait | 98/58 |

*Primary Examiner*—Stanley H. Tollberg
*Attorney, Agent, or Firm*—V. Dean Clausen; Lloyd S. Jowanovitz

[57] ABSTRACT

Harmful polluting materials, such as sulfur dioxide, nitrogen oxides, and fly ash, are carried into the atmosphere in stack gas effluents. An apparatus is disclosed which is useful for dispersing the stack gas into the atmosphere. The dispersing apparatus comprises basically a rotatable fan unit, which is mounted on a platform above the outlet of a vertical stack. Waste gas being discharged from the stack is thus propelled upwardly by the fan a substantial distance into the atmosphere. Dispersing the effluent gas in this manner reduces the concentration of the polluting materials in the atmosphere to a safe level.

3 Claims, 1 Drawing Figure

PATENTED OCT 15 1974 3,841,208
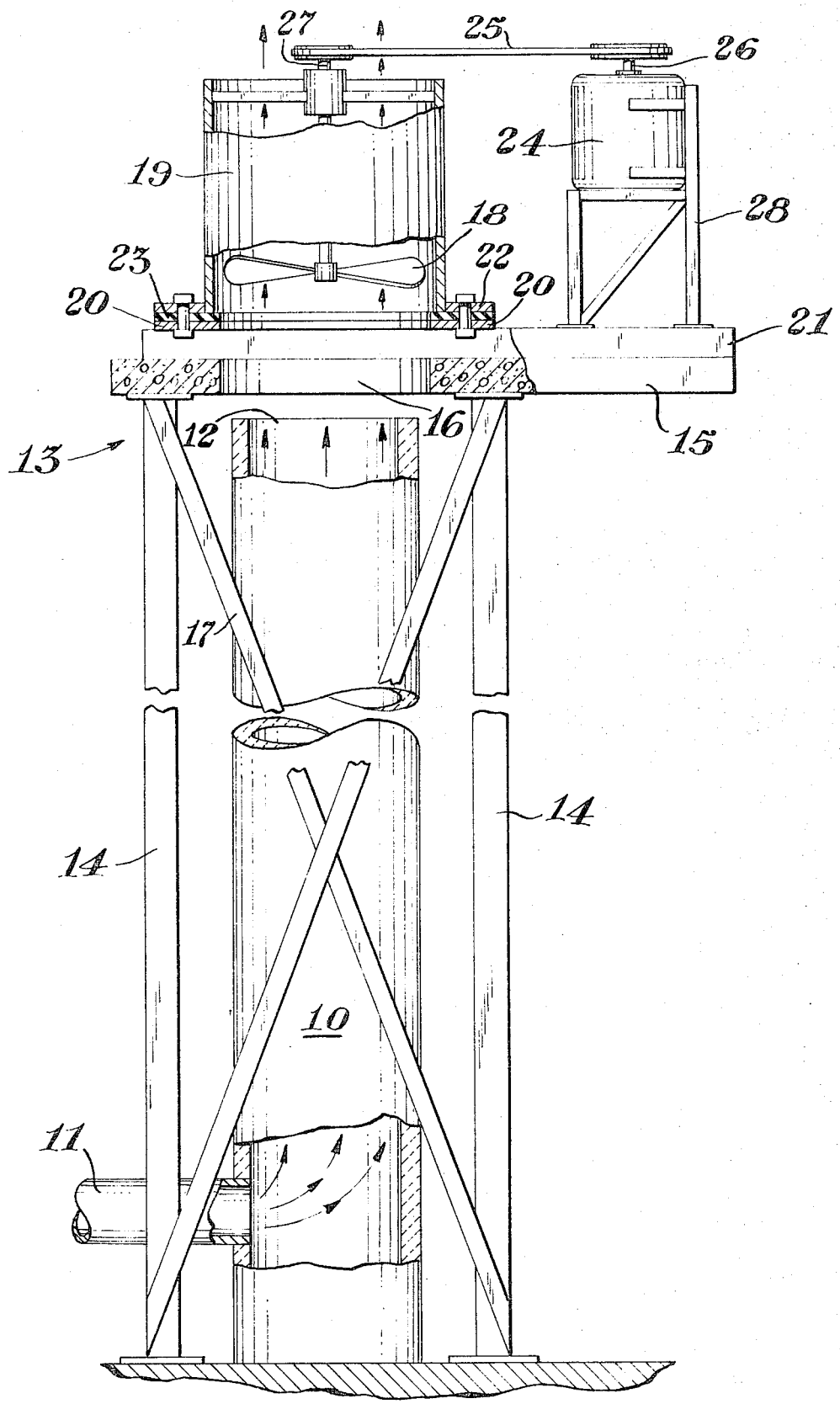

APPARATUS FOR DISPERSING EFFLUENT GAS INTO THE ATMOSPHERE

BACKGROUND OF THE INVENTION

This invention relates to an apparatus for dispersing stack gas effluent into the atmosphere. The purpose of the invention is to reduce the concentration of harmful polluting materials in the atmosphere, such as sulfur dioxide, nitrogen oxides, and fly ash, to an acceptable level.

Every year millions of tons of sulfur dioxide and other polluting materials, such as nitrogen oxides and fly ash, are carried into the atmosphere in the stack gas effluents which result from combustion of fossil fuels. The pollution of air with sulfur dioxide is of particular concern because of its potential hazard to human health. For example, Swedish scientists have made studies which indicate that air borne particles of sulfur dioxide and other noxious gases in the micron size range can become lodged in the lower respiratory tract of humans. These studies are described in "Methods Measure $SO_2$ in the Atmosphere," Chemical & Engineering News, Sept. 11, 1972, pages 44–46.

In connection with air pollution control in the United States, various commercial devices for monitoring the level of sulfur dioxide and other noxious gases in the atmosphere are in operation in many locations in the country. The monitoring devices are usually installed near industrial plants, such as mills, factories, and chemical plants. Present standards set by the U.S. Government require that the concentration of sulfur dioxide in the atmosphere should be not more than 0.3 parts per million (ppm) average over a 24 hour period. Present attempts to reduce the content of sulfur dioxide and other harmful constituents to an acceptable level in the atmosphere include use of various methods and devices for treating the effluent gas before discharging it from the stack. Many of these methods, however, are not commercially feasible in that they require costly equipment and materials.

SUMMARY OF THE INVENTION

The function of the present apparatus is to disperse effluent gas into the atmosphere from the outlet of a vertical stack. Basically, the apparatus comprises a support structure made up of several upstanding leg members and a platform with an opening therein. The lower ends of the leg members are anchored to a surface adjacent to the stack, and the upper ends of each leg extend above the stack outlet. The platform is fastened across the upper ends of the leg members, so that it is positioned above and horizontal to the stack outlet.

In this structure the opening in the platform is in direct alignment with the stack outlet. A rotatable fan unit is mounted on the platform above the opening, the fan being positioned such that it is in direct alignment with the opening in the platform. The function of the fan is to propel the effluent gases upwardly from the stack outlet, so that the gases disperse into the atmosphere. The fan unit is operated by a conventional drive means, such as an electric motor.

DESCRIPTION OF THE DRAWING

The single FIGURE of the drawing is a front elevational view, partly in section, of a vertical stack and a gas dispersal apparatus of this invention. In the illustration, the gas dispersing apparatus is shown in its operating position relative to the stack.

DESCRIPTION OF THE PREFERRED EMBODIMENT

Referring to the drawing, numeral 10 indicates a vertical stack. The stack shown herein, which is usually fabricated of brick, is of the type used to carry waste gas into the atmosphere from a power house or a similar unit in which coal or other fossil fuels are burned. The waste gas is conducted into the stack 10 through an inlet duct 11, the duct being connected at one end into the power house (not shown), and at the other end into the base of the stack. From the base of the stack, the waste gas rises upwardly through the stack and is discharged into the atmosphere from the outlet 12 at the upper end of the stack.

According to the invention, an apparatus is provided to disperse the waste effluent gas into the atmosphere from the stack outlet 12. One part of the gas dispersal apparatus, as generally indicated by numeral 13, is a basic support structure. The support structure 13 is made up of several upstanding leg members 14 and a platform 15, with an opening 16 in the platform. The lower end of each leg 14 is anchored to a slab embedded in the earth (not shown) or a similar solid surface located adjacent to the base of stack 10.

As shown, the upper end of the legs 14 extend above stack outlet 12 and platform 15 is fastened across the upper ends of the legs. In this structure, therefore, the platform 15 is positioned above and horizontal with the stack outlet 12, so that the opening 16 in the platform is in direct alignment with the stack outlet. Preferably, the legs 14 are additionally supported by diagonal cross braces 17, which are fastened across each pair of adjacently positioned legs.

The waste gas effluent which is discharged from stack outlet 12 is propelled upwardly into the atmosphere by a rotating fan unit. Basically, the fan unit comprises a rotatable blade 18, the blade being fastened to a vertical shaft 27, which is mounted centrally within a housing 19. The fan housing 19 is mounted on a pair of secondary support members 20, which, in turn, are fastened crosswise to a pair of main beam supports 21. For simplicity in the drawing, only one of the beam members 21 is illustrated.

The crosswise arrangement of the secondary supports 20, in relation to the beam 21, enables these fan support members to straddle the opening 16 in platform 15. The fan unit itself, therefore, is positioned directly above the opening 16. Specifically, the fan housing 19 is fastened to the supports 20 by a peripheral flange 22, which forms a part of the bottom edge of the fan housing.

In the practice of the invention, it is desirable to dampen any vibration which might be transmitted from the rotating fan blade to the support structure 13. To alleviate any vibration problem, a vibration isolater pad 23 is placed between the peripheral flange 22 and the secondary supports 20. Preferred materials for the isolator pad are weather-resistant materials which have good shock absorbing properties. Typical materials include certain types of rubber or expanded cellular polystyrene resins.

Suitable rotating fan units which may be used in this invention are any of the large (industrial size) commercially available fans, such as cooling tower fans. The fan unit can be driven by any of various conventional drive means, such as air motors, electric motors, and the like. In the present apparatus, the fan blade 18 is rotated by an electric motor 24. A belt drive 25 connects the motor shaft 26 with the fan blade shaft 27. Motor 24 is mounted on a pedestal or stand 28, the legs of the pedestal being fastened to the main beam support 21.

It is preferred to operate the motor 24 from a source of electric power (not shown) located at ground level, i.e., near the base of the stack 10. Understandably, the motor 24, or other suitable drive means, could be positioned at ground level or at some other point, remote from the fan unit. In the present structure, however, the motor 24 is mounted next to the fan unit, and at the same height, to permit a simple, convenient, direct drive from the motor to the fan unit.

To illustrate the practice of the invention, a typical operation of the disperal apparatus will now be described. When effluent gas is being discharged from the stack outlet 12, the fan unit is turned on to commence rotation of fan blade 18. The action of the rotating fan blade draws the effluent upwardly through the hollow fan housing 19 and propels the gas a substantial distance up into the atmosphere. In practice, it is considered desirable to propel the effluent gas at least 100 feet into the atmosphere above the stack outlet. In this regard, it will be realized that the actual distance that the discharge effluent is carried into the atmosphere will depend on several factors. Such factors include the height of the stack, size of the fan unit, and weather conditions, such as wind velocity and rain.

The primary object of this invention is to dilute the discharged effluent with enough air to lower the concentration of the pollutants in the atmosphere to a safe level. As explained earlier, concentration of pollutants in the atmosphere is usually measured by monitoring devices designed for this purpose. For example, to meet present government standards, as measured by one type of monitoring device, the concentration of sulfur dioxide in the atmosphere should be not more than about 0.6 ppm for 12 hours (average) or 0.3 ppm for 24 hours (average). To keep the concentration of sulfur dioxide at this level, it is contemplated that the air to gas dilution ratio should be about 10 to 100 parts air and 1 part effluent gas.

Suitable materials of construction for various components of the present apparatus will now be described. The leg members 14 and the main support beams 21 are preferably constructed of steel H beams or I beams. For the diagonal cross bases 17, the material can be either strap steel or steel H beams. Platform 15 should be constructed of a rigid and relatively heavy material, which has good vibration damping properties. Suitable materials for the platform include concrete, and certain types of wood or steel.

What is claimed is:

1. Apparatus for dispersing effluent gas into the atmosphere from the outlet of a vertical stack, which includes the combination of:

a support structure generally defined by several upstanding leg members and a platform having an opening therein, in which the lower end of each leg member is anchored adjacent to the base of the stack, the upper end of each leg member extends above the stack outlet, the platform is fastened to the upper ends of the leg members, such that the platform is positioned above and horizontal to the stack outlet, and the platform opening is aligned with the stack outlet, a rotatable fan unit which is mounted on the platform above the opening and in alignment therewith, and means enclosing the fan for propelling the effluent vertically upwardly from the stack outlet past the apparatus to thereby disperse the effluent into the atmosphere, a drive means operatively connected to a fan unit, for rotating the fan.

2. The apparatus of claim 1 in which the drive means is an electric motor, and the motor is connected to an electrical power source.

3. The apparatus of claim 2 in which the electric motor is mounted on the platform adjacent to the fan unit.

* * * * *